United States Patent

[11] 3,626,478

| [72] | Inventor | Frederick Lawton |
| | | Dar Es Salaam, Tanzania |
| [21] | Appl. No. | 844,128 |
| [22] | Filed | July 23, 1969 |
| [45] | Patented | Dec. 7, 1971 |
| [73] | Assignee | Tanzania Cashew Machines Limited |
| | | Dar es Salaam, Tanzania |
| [32] | Priorities | Sept. 11, 1968 |
| [33] | | Great Britain |
| [31] | | 43,149/68; |
| | | July 29, 1968, Great Britain, No. |
| | | 36,088/68 |

[54] CASHEW NUT DECORTICATING MACHINE
6 Claims, 16 Drawing Figs.

| [52] | U.S. Cl. | 146/10 |
| [51] | Int. Cl. | A23n 5/04 |
| [50] | Field of Search | 146/10, 7 |

[56] References Cited
UNITED STATES PATENTS

| 1,645,600 | 10/1927 | Kohler | 146/10 X |
| 2,067,566 | 1/1937 | Field | 146/10 X |
| 2,781,068 | 2/1957 | Anderson | 144/241 X |

*Primary Examiner*—Willie G. Abercrombie
*Attorney*—Sughrue, Rothwell, Mion, Zinn and Macpeak ABSTRACT: A cashew nut decorticating machine comprises a rotatable turret having three nut holding devices equiangularly spaced about the axis of rotation, means for rotating the turret in stepwise manner so that, after each step of rotation, each nut-holding device is opposite one of three stations, means at the first station for supplying a single nut to the nut-holding device opposite it, means at the second station for cutting right round and through the shell of the nut held in the nut-holding device opposite it, and means at the third station for removing the grooved nut from the nut-holding device opposite it, separating the two cut halves of the shell and ejecting the kernel.

CASHEW NUT DECORTICATING MACHINE

BACKGROUND OF THE INVENTION

1. Field of the Invention

The present invention relates to a decorticating machine for nuts and in particular for cashew nuts.

2. Description of the Prior Art

The cultivation and scale of cashew nuts is a very important industry, but the full possibilities of the industry have not yet been realized because of the difficulties involved in the decortication of the nuts. Up to the present time, a considerable proportion of the work has had to be done by hand, which is slow and tedious.

Various processes for decorticating cashew nuts have been evolved. In one such process, screened and boiled nuts are pushed one after another by hand into a slot where a U-shaped knife makes a cut around the periphery of the nut. They are then passed into a machine which throws them by a centrifugal force against projections which break the outer shells, and they are then passed to a shaker/grader which separates the kernels from the shells. Any nuts not opened are passed through the process again and any kernels fast in a half shell are picked out by hand. In another process, screened and boiled nuts are passed down a slide under a hammer that is moving up and down which cracks the shells. They are then sorted by hand. In a third process, screened and frozen nuts are fed into a machine which cuts a groove around the nuts. They then go to a shaker/grader to be separated. Any not opened have to be hand-treated. In yet another process, the nuts are boiled, and then processed until the shells are brittle, the nuts are then fed into a machine which throws them by centrifugal force against projections which break the shells. Once again the nuts are sorted on shaker/graders and returned for further treatment if not opened.

Each of these processes suffers from one of two drawbacks. Either it is not fully automatic and requires a hand-sorting step, or it is not fully effective in that some nuts may not be opened and will then have to be returned.

SUMMARY OF THE INVENTION

According to the invention, a cashew nut decorticating machine comprises a rotatable turret having three nut holding devices equiangularly spaced about the axis of rotation, means for rotating the turret in stepwise manner so that, after each step of rotation, each nut-holding device is opposite one of three stations, means at the first station for supplying a single nut to the nut-holding device opposite it, means at the second station for cutting right round and through the shell of the nut held in the nut-holding device opposite it, and means at the third station for removing the grooved nut from the nut-holding device opposite it, separating the two cut halves of the shell and ejecting the kernel. When cashew nuts are supplied to this machine, there is no possibility of any nuts not being opened; each nut is opened separately and the kernel ejected mechanically from whichever of the half-shells in which it is lodged.

The formation of the cut through the shell of the nut is an important feature of the machine, and it is preferred that the shell should be cut right through, and that there should be a shallow cut. To do this, the means at the second station preferable comprises a saw blade, the cross section of the cutting edge of each tooth having a elevated central portion. Such a saw blade may be originally of conventional cross section and then be ground to the desired cross section, or may be made up of three blades sandwiched together, the teeth on the center blade standing up above the teeth on the outer blades. The groove will normally be about one-eighth inch wide, and the depth will be selected depending on the average screened size of the nuts being shelled.

In the preferred form of machine, the means at the third station is designed to work on nuts which have been cut through and a groove formed in the shell also. The means at the third station then comprises two arms, each hinged about adjacent axes parallel to the plane of the groove in the held nut and each incorporating two jaws themselves hinged about adjacent axes on the arm perpendicular to the plane of the groove, and includes means whereby the pair of jaws may be caused to fit into and encircle the groove in the held nut when the arms are parallel, and means whereby the two arms may be rotated apart on their axes to force the two halves of the shell apart and cause the kernel to be ejected.

Once the halves of the shell have been separated, the kernel will be lodged in one or other half-shell. It is then preferably dislodged by means which cause a probe to penetrate each half-shell from the back as the arms are rotated apart, thereby ejected the kernel from whichever half-shell it is in, and then cause the jaws on the arms to open leaving a half-shell impaled on each probe, and finally cause each probe to withdraw through a guide so that the half-shells fall from the probes.

BRIEF DESCRIPTION OF THE DRAWINGS

One form of the machine according to the invention will now be described with reference to the accompanying drawings, in which.

It will be appreciated that, for the sake of clarity in the drawings, not all the parts appearing on any one drawing are necessarily shown where they would appear on another. All the parts essential for an understanding of the operation of the machine however, are shown throughout.

DESCRIPTION OF THE PREFERRED EMBODIMENT

The machine consists of four integers mounted in a framework indicated generally as 1, these being a rotatable turret shown as 2, a nut-loading apparatus 3, a saw mechanism 4 and a kernel-dislodging device 5. Each of these integers will now be described in turn, and their interaction in the operation of the machine will be set out.

The rotatable turret is made up of two discs 6 each mounted on a stub axle 7 in bearings 8. Equiangularly spaced around each disc, near its circumference, are nut-holding devices 9, in the form of rods with spikes on their inwardly directed ends, the rods being so mounted in the discs as to be capable of longitudinal movement under the influence of cam and follower mechanism indicated at 10 and linkage indicated at 11. As the turret is rotated, so cooperating pairs of nut-holding devices are brought together or drawn apart to impale a nut or release it.

Figure 4:
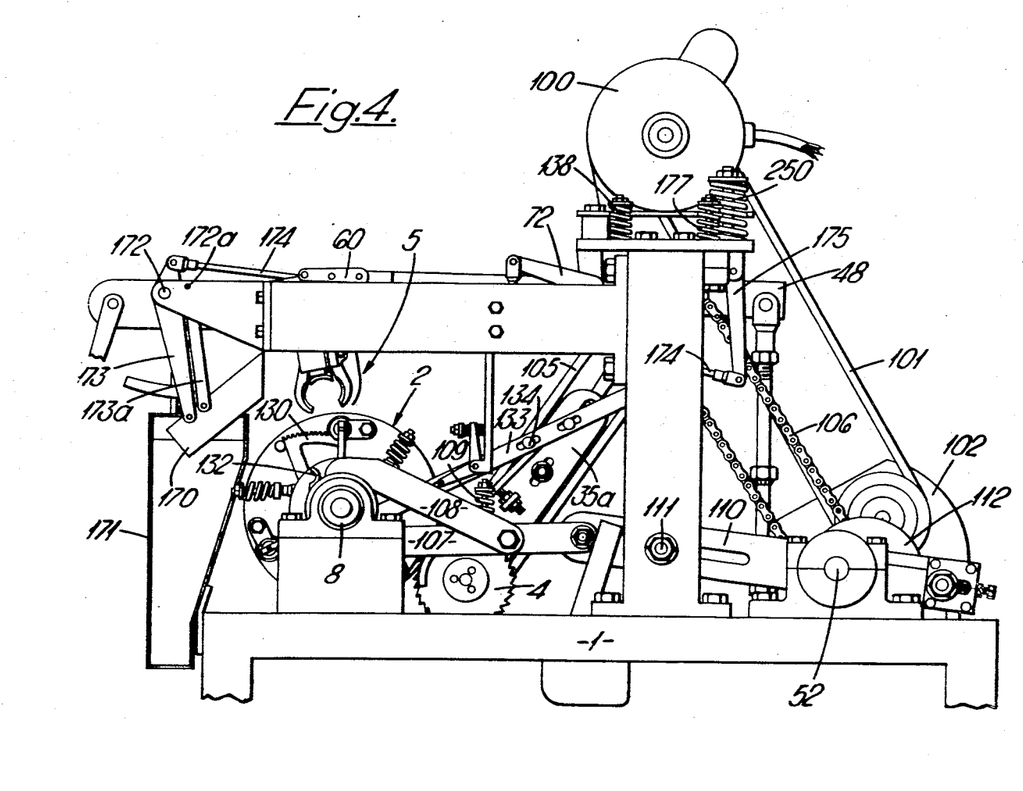
FIG. 4 is a nearside view of the machine; not showing the nut-loading apparatus but including the chutes for directing the ejected nut kernel away from the machine.
Figure 6:
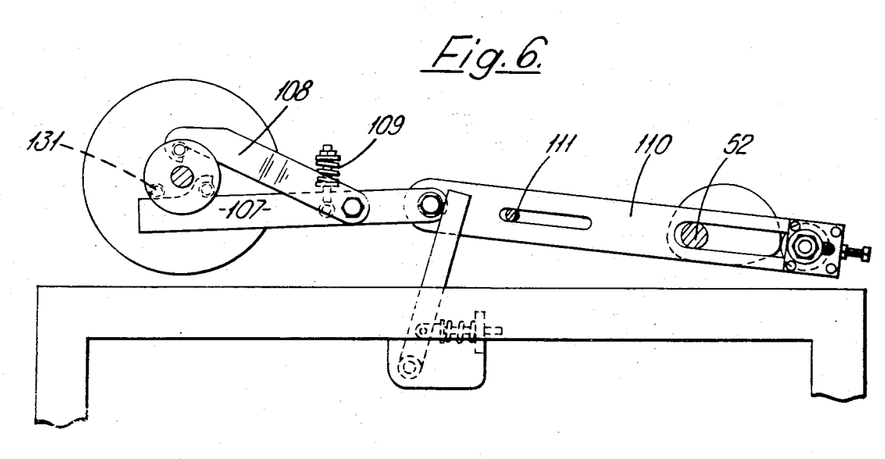
FIG. 6 shows a greater detail the mechanism for stepwise rotation of the turret outlined in FIG. 5.

Stepwise rotation of the turret 2 on its axle 7 is actuated by mechanism shown in FIG. 4 and in more detail in FIG. 6. A slotted plate 110 is mounted on a pin 111 and oscillates longitudinally under the influence of an eccentric mounting 112 on an axle 52; a hooked lever 107 is pivoted at the end of the plate 110, and a second hooked lever 108 is pivoted on the lever 107. These levers are urged together by a spring 109. On oscillation of the plate 110, the hook of the lever 107 engages a peg 131 on the turret 2 and rotates the turret, and the second lever 108 engages another peg 131 and prevents the turret rotating too far. The turret is thus held in the indexed position, as shown.

Figure 3:
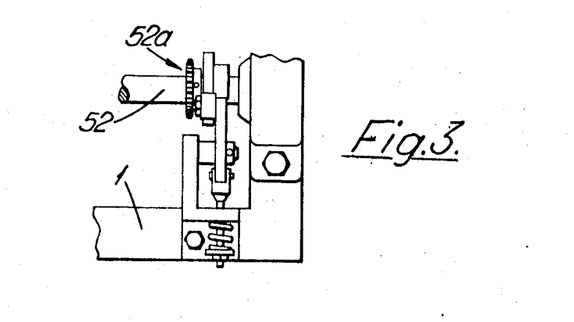
FIG. 3 is a plan view of a small part of the machine, corresponding to the right hand side of FIG. 2.
Figure 5:
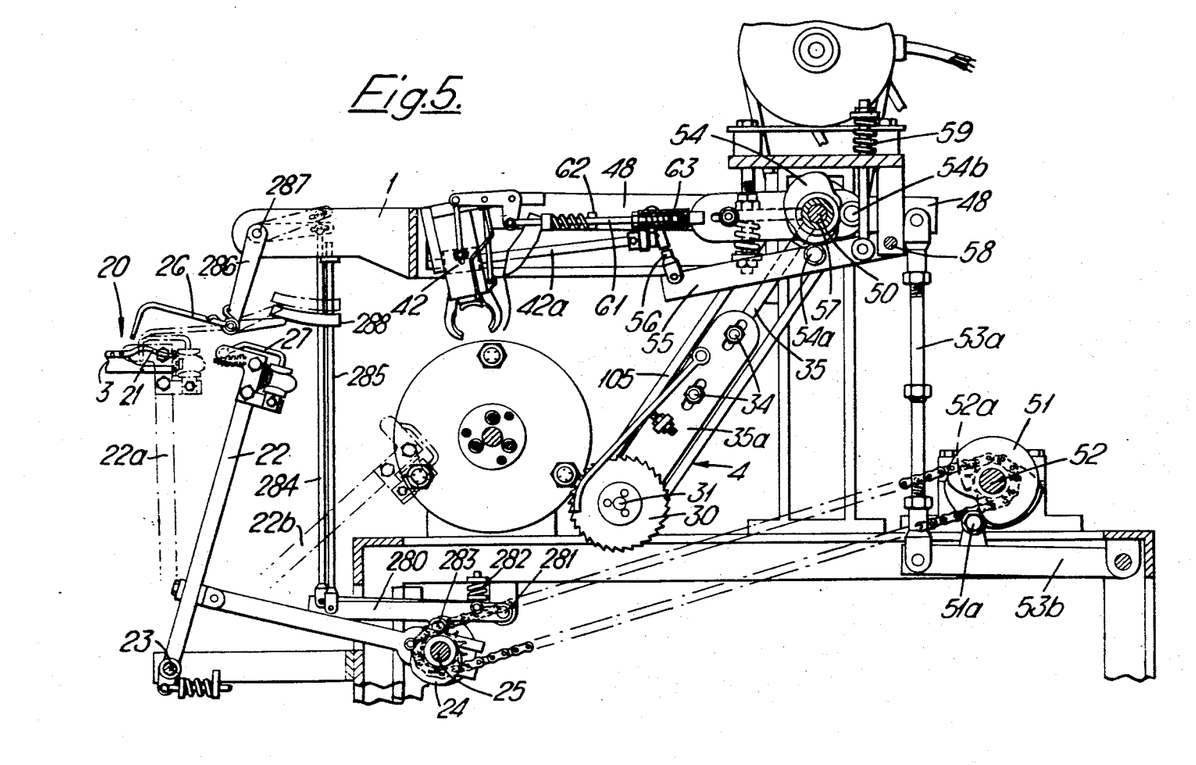
FIGS. 5 and 7 are similar sectional views of the machine in elevation from the near side, taken approximately along the longitudinal center line, FIG. 5 showing in detail the nut-loading apparatus and FIG. 7 showing in detail the mounting an range movement of the chute.

The nut loading apparatus is shown in detail in FIG. 5. Screened and sized nuts are directed in a single line to a position 20 where they are guided one at a time by a spring clip 21. A loading arm 22 is mounted at 23, and is oscillated between end positions 22a and 22b by a cam mechanism 24 on a shaft 25 which is itself driven by a chain from the axle 52; the sprocket on the axle 52 for this chain drive is shown as 52a in FIG. 3. When the position of the shaft 25 and associated cam mechanism 24 is such that the loading arm is in its end position 22a, it will be seen that an arm 280 pivoted at 281 and biassed downwardly by a spring 282 is in an intermediate position by interaction of a follower 283 with a cam on the shaft 25 which is actually behind the cam 24 in FIG. 5 and therefore not shown. Two rods 284 and 285 extend from the end of the arm 280; the first of these is linked to one end of a bellcrank lever 286 pivoted at 287, and the second is merely guided for longitudinal movement in the framework 1 and carries a crossarm 288. Pivoted on the other end of the bellcrank lever 286, and biassed with respect to it is a claw device 26, relative movement of the bellcrank lever and the claw device being limited by interaction of an extension 26a of the claw device and the crossarm 288. As the shaft 25 rotates, so the arm 280 is lifted, the claw device dips behind a nut under the spring clip 21 by virtue of the raising of the rod 285, and the nut is dragged into a spring holder 27 on the arm 22 by a virtue of the raising of the rod 284, and rotation of the bellcrank lever 286; the arm 22 then oscillates about the point 23 to its end position 22b, and the nut is then ready to be engaged by a nut-holding device on the turret.

Figure 1:
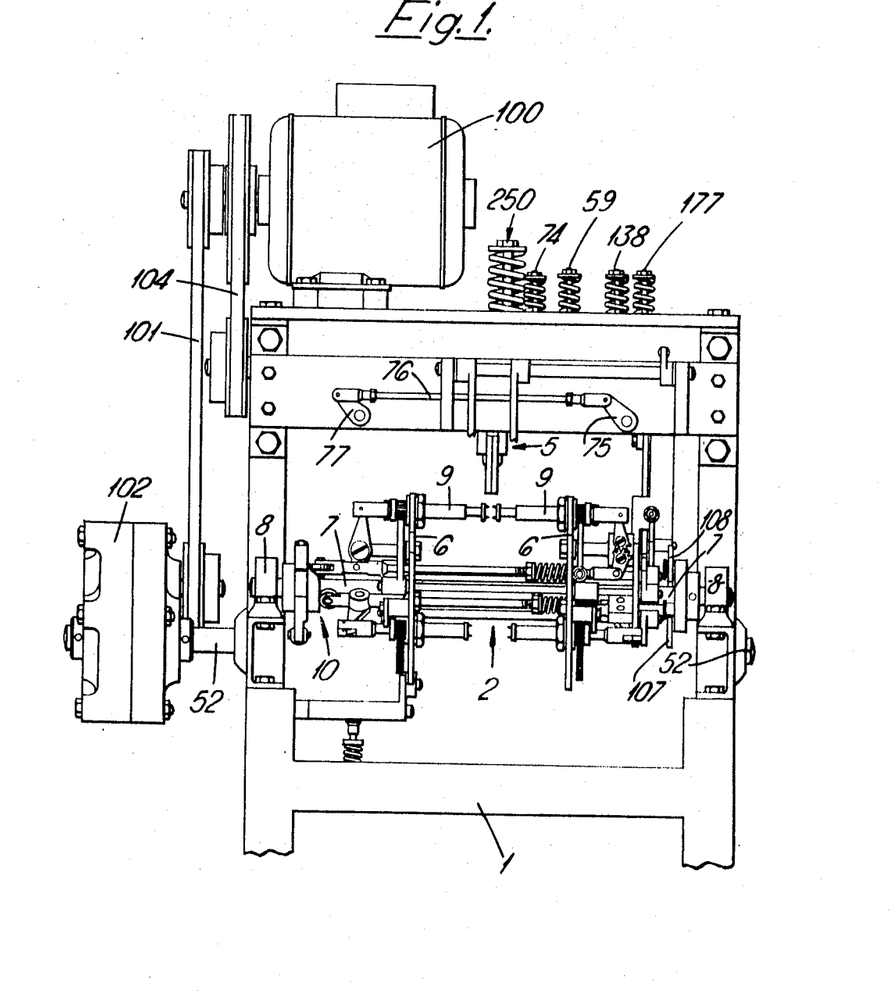
FIG. 1 is a front view of the machine.
Figure 2:
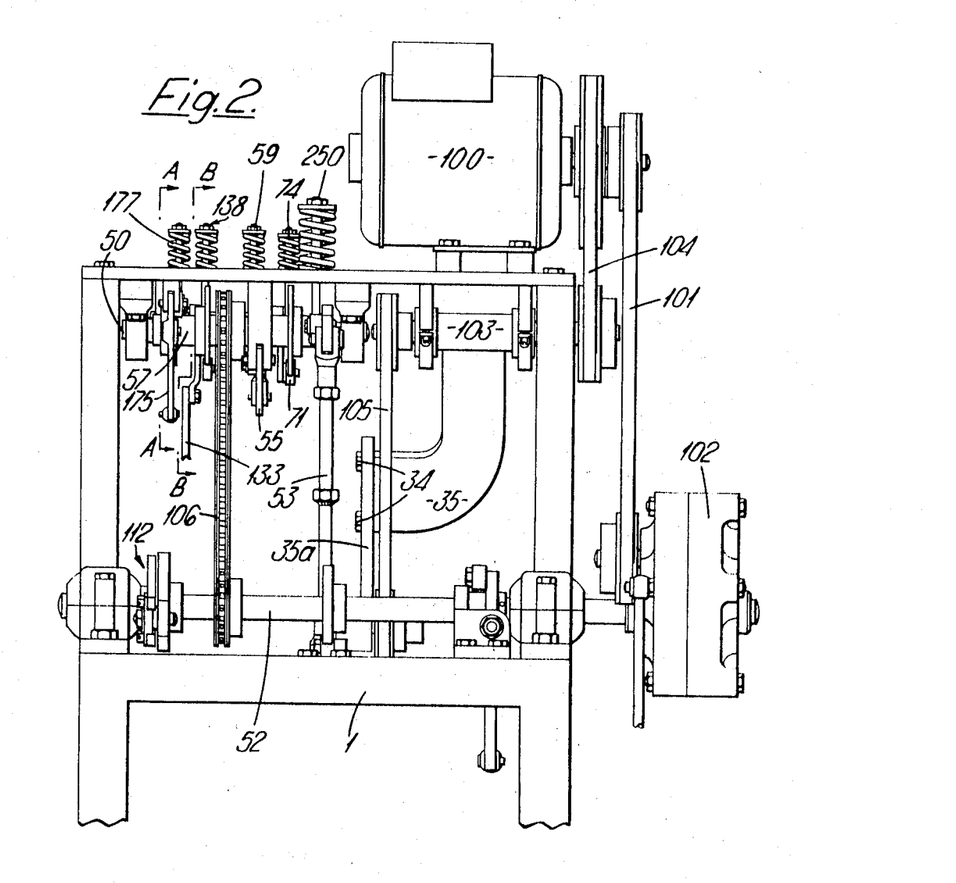
FIG. 2 is a rear view of the machine.
Figure 8:
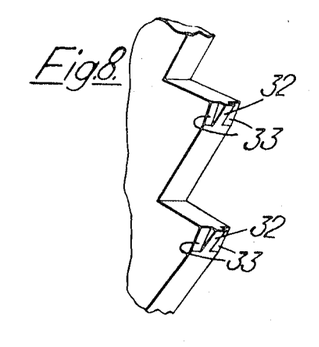
FIG. 8 shows the cross section of the saw blade.
Figure 9:
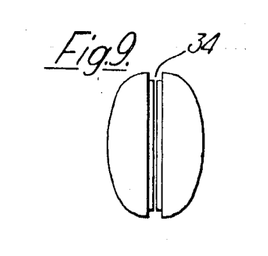
FIG. 9 shows the form of groove cut on a nut.

The saw mechanism 4 is mounted at the second station, and consists of a circular saw blade 30 and an axle 31. An enlarged view of the teeth of the circular saw is shown in FIG. 8, where it may be seen that each tooth has a raised central portion 32 flanked by lower portions 33. When a nut is sawn by a blade of this shape, the resulting cut 34 is as in FIG. 9, the nut shell being cut right through by the portion 32 of the blade, and a shallow groove being formed on each side of the cut by the portions 33. The saw mechanism 4 is mounted on an arm 35 and a plate 35a dependent from a shaft 103 (see FIG. 2) and is adjustable in position by means of pins and slots 34.

Figures 15, 16:
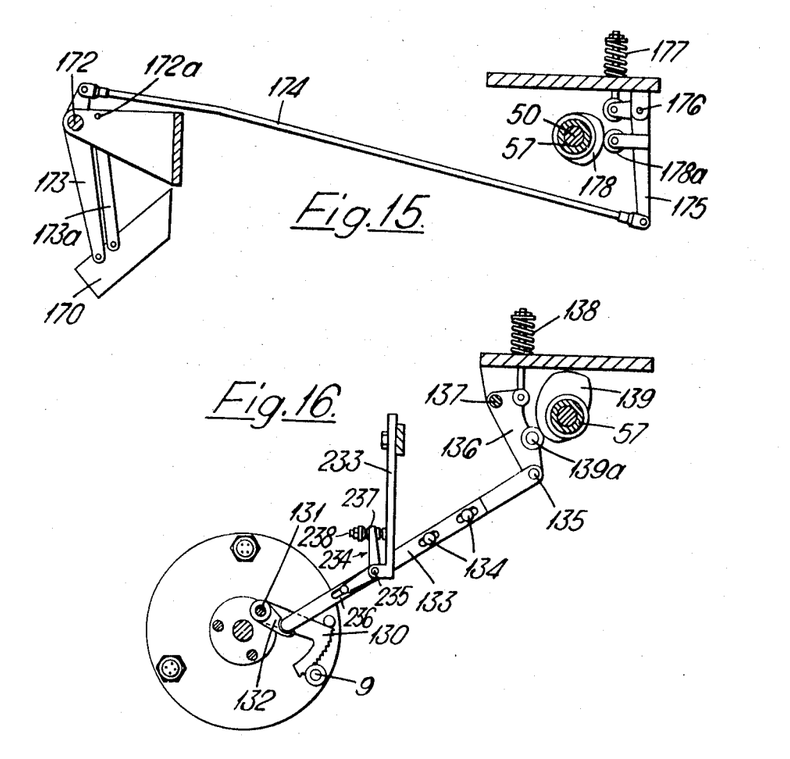
FIG. 15 shows the linkage operating the chute and is a part section of the line A—A of FIG. 2
FIG. 16 shows the nut-rotating mechanism and is a part section on the line B—B of FIG. 2.

In conjunction with the saw mechanism 4 is a mechanism whereby each nut can be rotated as it is sawn. This is shown in detail in FIG. 16; each station on the rotary turret has a toothed arc 130 (one only shown) engaging a toothed extension of the nut-holding device 9; the arc 130 is biassed about its pivot, the peg 131, by a spring (not shown) against a stop. Also on the pivot 131 rigid with the arc 130 is an arm 132 having a cup shaped recess to engage the end of a slotted rod 133 itself located on pins 134. This rod 133 is pivoted at 135 on a plate 136 itself pivoted at 137, biassed by a spring 138 and having a cam follower 139a cooperating with a cam 139 on a sleeve 57. On rotation of the cam 139, the rod 133 is slid downwardly to engage the arm 132 at the station, and rotate the nut. There is sufficient play in the pins 134 to enable the end of the rod 133 to stay in the recess as the arm 132 rotates; a spring linkage 234 in the form of a bellcrank lever is pivoted at 235 on a bracket 233 forming part of the framework 1, one end of the bellcrank being slideable in a slot 236 in the rod 133, and the other end restrained by a spring 237 on a pin 238 on the bracket 233, and the effect of this spring linkage is to return the rod 133 to the correct position each time to engage the next arm 132, and to ensure that the rod 133 always strikes the arm 132 in the center of the cup-shaped recess.

Figure 10:
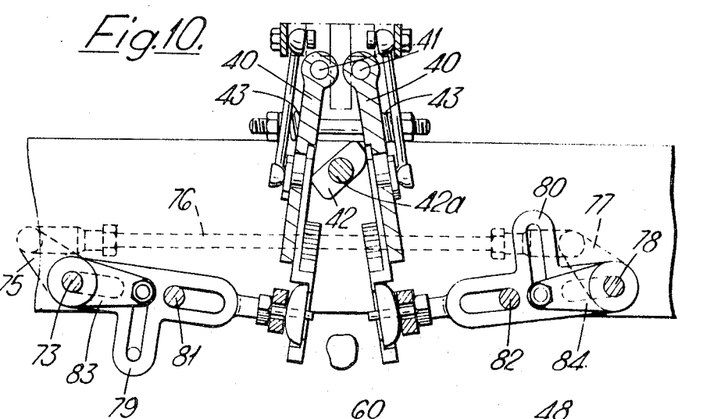
FIGS. 10 and 14 show in more detail the device used to dislodge the kernel from whichever of the separated half shells it is in, FIG. 10 being a view of the device from the rear of the machine, FIG. 11 being a view of it from the near side of the machine, and FIGS. 12, 13, and 14 being views of the operating linkage.
Figure 11:
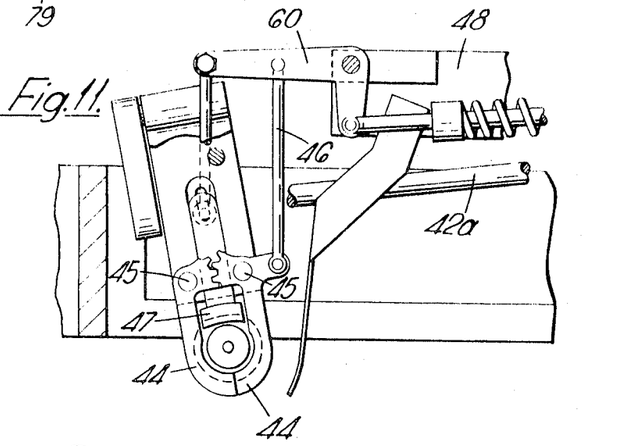
Figure 12:
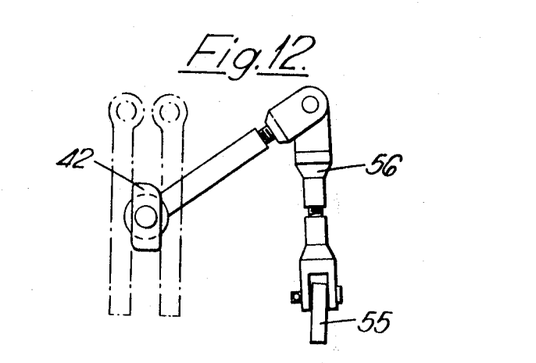

The kernel dislodging device 5 is shown in FIG. 5, and in greater detail in FIGS. 10, 11 and 12. It consists of two arms 40 hinged about adjacent axes 41, designed to be opened or closed under the action of a cam 42 on a shaft 42a and springs 43. Each arm 40 incorporates two jaws (see FIG. 11) which open about axes 45 under the action of a linkage 46; a third jaw 47 in each arm cooperates with the two jaws 44 to engage in the cut 34 in a nut. The whole device 5 is mounted on an arm 48 pivoted on the shaft 50, biassed by a spring 250, and is oscillated by interaction between a cam 51 on the axle 52 and a cam follower 51a through a train of levers 53a and 53b.

The cam 42 is operated by a cam 54, mounted on the sleeve 57 on the axle 50, and a cam follower 54a on a bar 55 pivoted at 58; oscillations of the bar 55 about its pivot are under the influence of a spring 59, and are transmitted to the cam 42 through a linkage 56 (see FIG. 12). Operation of the jaws 44 and 47 is by means of a bellcrank lever 60 mounted on the arm 48, through a spring loaded linkage 61 operating against a stop 62 and a spring loaded-lost-motion device 63 to a plate 64 which is slotted to slide on a pin 65 and the axle 50, and bear a cam-follower 54b to cooperate with the cam 54. The purpose of the device 63 is to prevent damage to the jaws 44 and 47 should an unusually large nut be presented to them.

Figure 13:
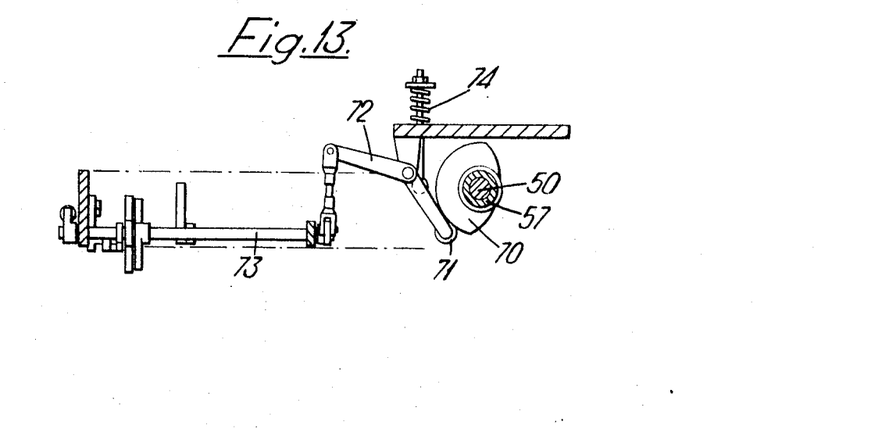
Figure 14:
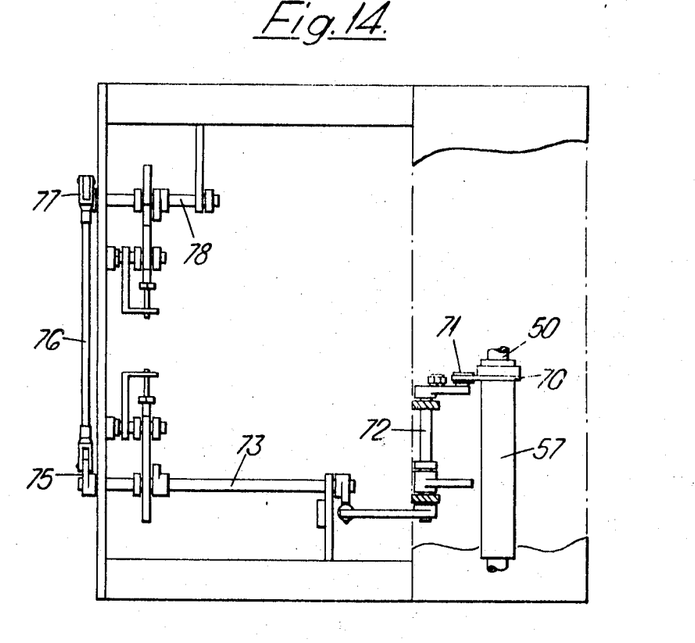

The action of the probes will now be described with reference to FIGS. 10, 13 and 14. A cam 70 is mounted on the sleeve 57, and this cam cooperates with a cam-follower 71 through a linkage 72 to oscillate a rod 73 about its axis; the linkage is biassed against the cam by a spring 74. A crank arm 75 on the rod 73 is joined by a linkage 76 to a second crank arm 77 on a rod 78 which can also oscillate about its axis. Slideably mounted on each of the rods 73 and 78 are T-shaped linkages 79 and 80 bearing the actual probes, these T-shaped linkages being positioned on studs 81 and 82. Further crank levers 83 and 84 are rigidly connected to the rods 73 and 76, and convert the rotary oscillatory motion of the rods into linear oscillatory motion of the T-shaped pieces, and hence of the probes in the jaws 44 and 47.

The actions controlling the kernel-dislodging device 5 are thus threefold, firstly the actual location of the whole device by movement of the arm 48, secondly the opening and closing of the jaws from the cam 54 and the follower 54b, and thirdly the separation of the arms from the cam 54 and follower 54a.

Figure 7:
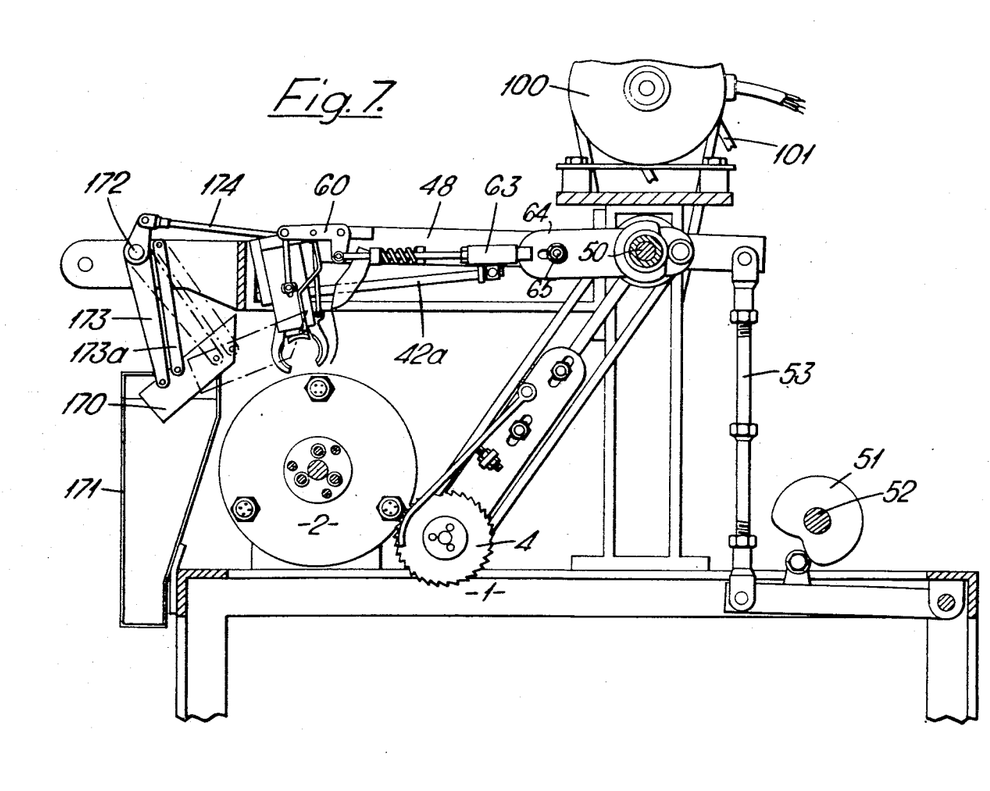

When a nut has been cut and the two halves separated in the device 5, the kernel drops into a chute, composed of a moveable portion 170 and a fixed portion 171, (FIGS. 4 and 7). The moveable portion 170 is pivoted about pivots 172 and 172a on arms 173 and 173a under the control of a linkage 174. The linkage 174 is pivoted on an arm 175 itself pivoted at 176 and biassed by a spring 177, and carrying a cam follower 178a designed to cooperate with a cam 178 on the sleeve 57. The mounting of the cam 178 on the sleeve 57 is such that the moveable portion 170 of the chute will be under the device 5 when the latter is fully raised and ejects the kernel of a nut, and will then retract the portion 170 so that the kernel is deposited into the portion 171. In operation, the jaws 44 and 47 grip the nut and the nut-holding devices 9 are withdrawn. The probes are moved inwardly, and the cam 42 is rotated so that the nut is split into two halves which are impaled on the probes. The kernel drops into the chute 170 which is then withdrawn to leave a clear space for the shells to fall as the probes are withdrawn.

The machine is powdered by a single motor 100, which drives the main shaft 52 by means of a belt drive 101 through a gear box 102, and the subsidiary shaft 103 by a belt drive 104. The sleeve 57 on the shaft 50 is driven by a chain drive 106 from the shaft 52. The speed of the motor and the gearing is such that the sleeve 57 rotates at 60 r.p.m., that is to say the machine will deal with one nut per second.

The operation of the machine will now be described in simple terms. It will be appreciated that the timing of the various steps is controlled by the various cam mechanisms on the drive shafts through the linkages described. Operations are, of course, occurring at each station simultaneously, but for simplicity the operations will be described in terms of the transit of one nut.

A nut is picked up in the spring holder 27, swung over to the turret and impaled in the nut-holding device at that moment at 8 o'clock on the turret (FIG. 5). The turret is then rotated by 120° by the rachet-and-pawl mechanism 107–112 to the station at 4 o'clock where the nut is rotated and is sawn by the saw mechanism 4. The turret is then further rotated by a further 120°, and the kernel dislodging device is lowered and the jaws 44 and 47 grip the nut. The nut-holding devices are withdrawn so that the nut is released, and the arms 40 are parted and the probes eject the kernel so that it falls into the moveable portion 170 of the chute, then into the fixed portion 171 and finally away from the machine. The cycle then begins again.

We claim:

1. A decorticating machine for nuts having an outer shell and an inner kernel comprising a rotatable turret;
    means for holding nuts on the rotatable turret;
    means for supplying a nut to the holding means;
    means for cutting both a peripheral groove on the shell of the nut and cutting through the shell;
    a means for gripping the nut on opposite sides of the peripheral groove;
    means for separating the shell into two separate parts;
    means for entering each separate part of the shell to eject the kernel if it is lodged in one of the parts of the shell, and
    means for ejecting each shell part whereby the kernel is positively removed from the outer shell.

2. A machine as defined in claim 1 where the means for entering each separate part of the shell includes a probe that penetrates the back of the shell part to force the kernel through the cut opening.

3. A decorticating machine for nuts having an outer shell and an inner kernel comprising a rotatable turret;
    means for holding nuts on the rotatable turret;
    means for supplying a nut to the holding means;
    means for cutting both a peripheral groove on the shell of the nut and through the shell;
    means for gripping and separating the shell into halves including a pair of arms hinged about axes parallel to the plane of the groove in the shell as it is gripped,
    a jaw on each arm hinged on axes perpendicular to the place of the groove and capable of fitting and encircling the groove in the shell, and means for rotating the arms and jaws so that the shell is separated into halves;
    probe means for penetrating the back of each half of the shell to eject the kernel from whichever shell half it is in, and,
    guide means for ejecting the shell halves from the probe means.

4. A machine as defined in claim 3 in which the means for cutting the shell includes a saw blade having an elevated central portion and adjacent cutting side portions, whereby the shell can be cut right through by the central portion while the side portions cut a groove surrounding the central cut.

5. A machine as defined in claim 3 in which the holding means on the turret includes two plates each having spikes provided on one of their surfaces, the plates being positioned on the turret with their spikes facing each other whereby a nut can be impaled on the spikes and held between the plates.

6. A machine as defined in claim 4 where the saw blade is made up of three blades sandwiched together.

* * * * *